(12) United States Patent
Kasahara

(10) Patent No.: US 10,198,867 B2
(45) Date of Patent: Feb. 5, 2019

(54) DISPLAY CONTROL DEVICE, DISPLAY CONTROL METHOD, AND PROGRAM

(71) Applicant: Sony Corporation, Tokyo (JP)

(72) Inventor: Shunichi Kasahara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/097,409

(22) Filed: Apr. 13, 2016

(65) Prior Publication Data

US 2016/0284133 A1    Sep. 29, 2016

Related U.S. Application Data

(63) Continuation of application No. 14/006,856, filed as application No. PCT/JP2012/001963 on Mar. 22, 2012, now Pat. No. 9,373,195.

(30) Foreign Application Priority Data

Mar. 31, 2011 (JP) ................. 2011-078072

(51) Int. Cl.

| | | |
|---|---|---|
| G06T 19/00 | (2011.01) | |
| G06K 9/00 | (2006.01) | |
| G06F 3/0488 | (2013.01) | |
| G06F 17/30 | (2006.01) | |
| G06F 3/0484 | (2013.01) | |

(Continued)

(52) U.S. Cl.
CPC .......... *G06T 19/006* (2013.01); *G06F 3/0488* (2013.01); *G06F 3/04842* (2013.01); *G06F 17/30247* (2013.01); *G06K 9/00671* (2013.01); *G06F 3/14* (2013.01); *G09G 5/377* (2013.01); *G09G 2370/02* (2013.01)

(58) Field of Classification Search
CPC ............. G06T 19/006; G06F 17/30247; G06F 3/0488; G06F 3/04842; G06F 3/14; G06K 9/00671; G09G 2370/02; G09G 5/377
USPC ......................................................... 345/633
See application file for complete search history.

(56) References Cited

U.S. PATENT DOCUMENTS

| | | |
|---|---|---|
| 8,259,176 B2 | 9/2012 | Misawa et al. |
| 2004/0105427 A1 | 6/2004 | Friedrich et al. |

(Continued)

FOREIGN PATENT DOCUMENTS

| | | |
|---|---|---|
| EP | 2107480 A1 | 10/2009 |
| EP | 2302322 A2 | 3/2011 |

(Continued)

OTHER PUBLICATIONS

Chinese Office Action for Application No. 201210080649.X, dated Apr. 6, 2016.

(Continued)

*Primary Examiner* — Ke Xiao
*Assistant Examiner* — Kim Thanh T Tran
(74) *Attorney, Agent, or Firm* — Lerner, David, Littenberg, Krumholz & Mentlik, LLP

(57) ABSTRACT

An apparatus comprising a memory storing instructions and a control unit is disclosed. The control unit may be configured to execute the instructions to: acquire an image of real space, detect an object of interest within the real space image, obtain a still image of the object, and display a virtual image relating to the object superimposed on the still image.

12 Claims, 14 Drawing Sheets

(51) Int. Cl.
*G06F 3/14* (2006.01)
*G09G 5/377* (2006.01)

(56) References Cited

U.S. PATENT DOCUMENTS

| | | | |
|---|---|---|---|
| 2004/0119662 A1* | 6/2004 | Dempski | G01S 3/7864 |
| | | | 345/8 |
| 2006/0002590 A1 | 1/2006 | Borak | |
| 2007/0035562 A1 | 2/2007 | Azuma et al. | |
| 2008/0033642 A1* | 2/2008 | Emoto | G01C 21/3638 |
| | | | 701/436 |
| 2008/0071559 A1* | 3/2008 | Arrasvuori | G06Q 30/06 |
| | | | 705/26.1 |
| 2009/0237546 A1 | 9/2009 | Bloebaum et al. | |
| 2009/0319058 A1 | 12/2009 | Rovaglio et al. | |
| 2012/0105474 A1 | 5/2012 | Cudalbu et al. | |
| 2012/0105475 A1* | 5/2012 | Tseng | G01C 21/3611 |
| | | | 345/633 |
| 2012/0120103 A1* | 5/2012 | Border | G02B 27/017 |
| | | | 345/633 |

FOREIGN PATENT DOCUMENTS

| | | |
|---|---|---|
| JP | 10-313421 A | 11/1998 |
| JP | 2003-323239 A | 11/2003 |
| JP | 2007-286569 A | 11/2007 |
| JP | 2007-295446 A | 11/2007 |
| JP | 2008017109 A | 1/2008 |
| JP | 2010-238098 A | 10/2010 |

OTHER PUBLICATIONS

Extended European Search Report for EP Application No. 12765510.8, dated Nov. 17, 2014.

Japanese Office Action for JP Application No. 2011078072, dated Feb. 3, 2015.

European Office Action for Application No. 12765510.8, dated Jun. 22, 2017.

European Office Action for Application No. 12765510.8, dated Sep. 27, 2018.

* cited by examiner

[Fig. 1]
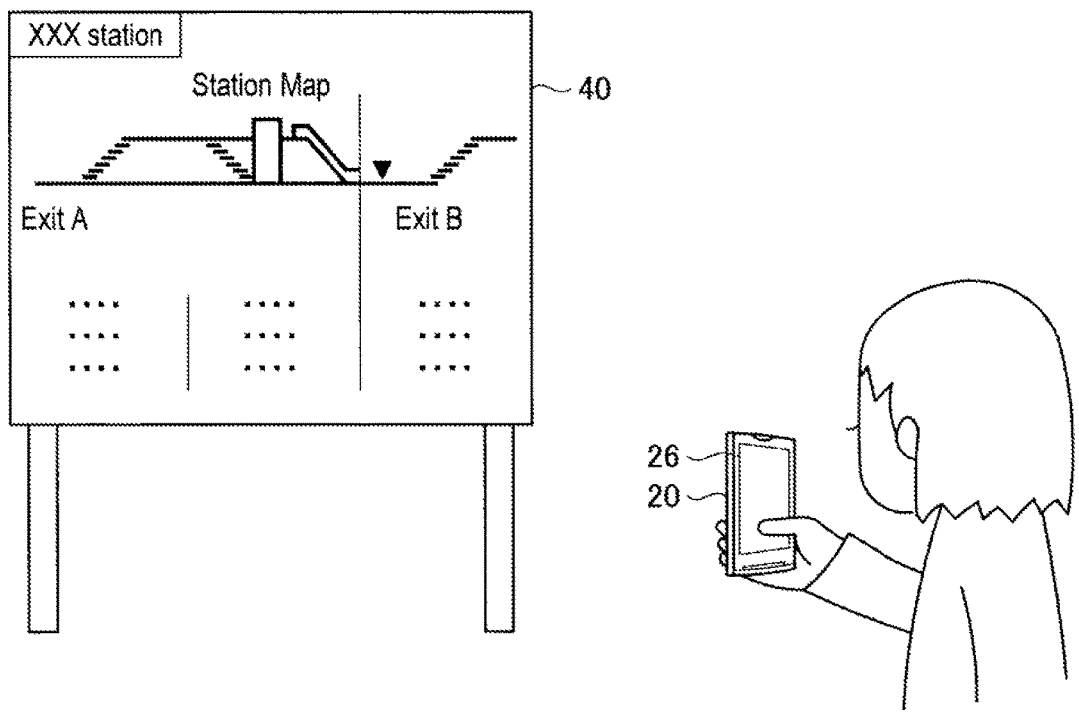
[Fig. 2]
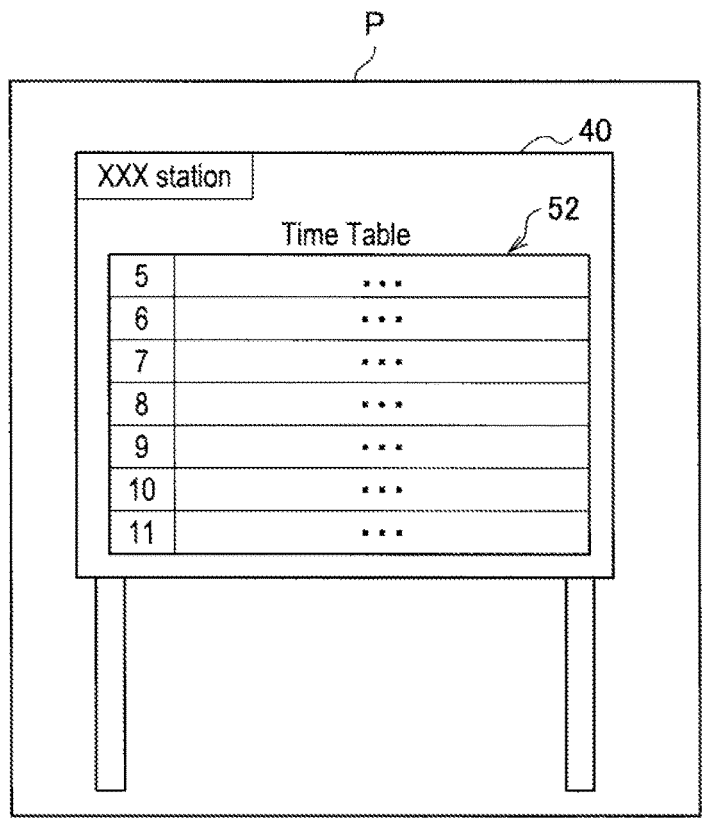

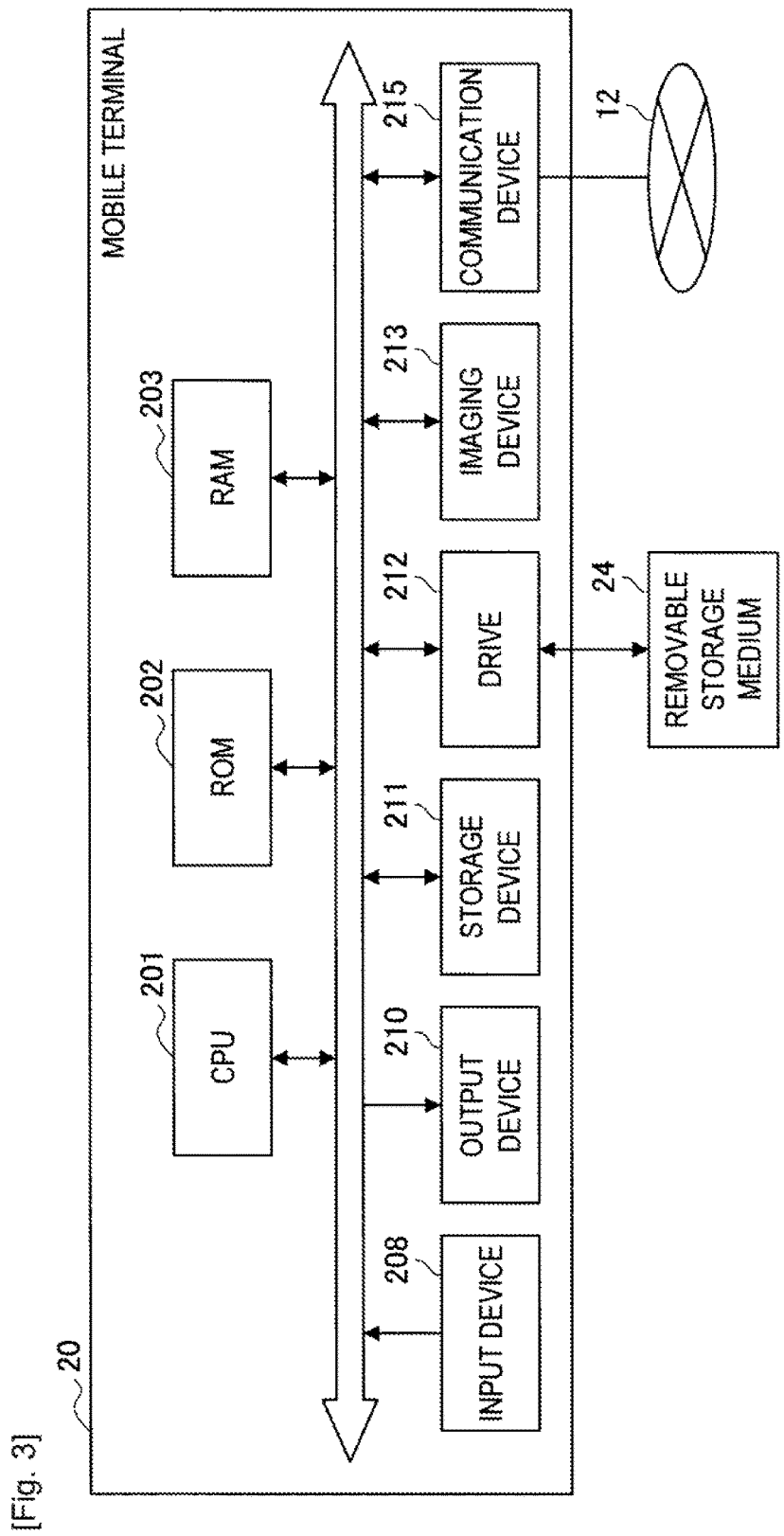
[Fig. 3]

[Fig. 4]
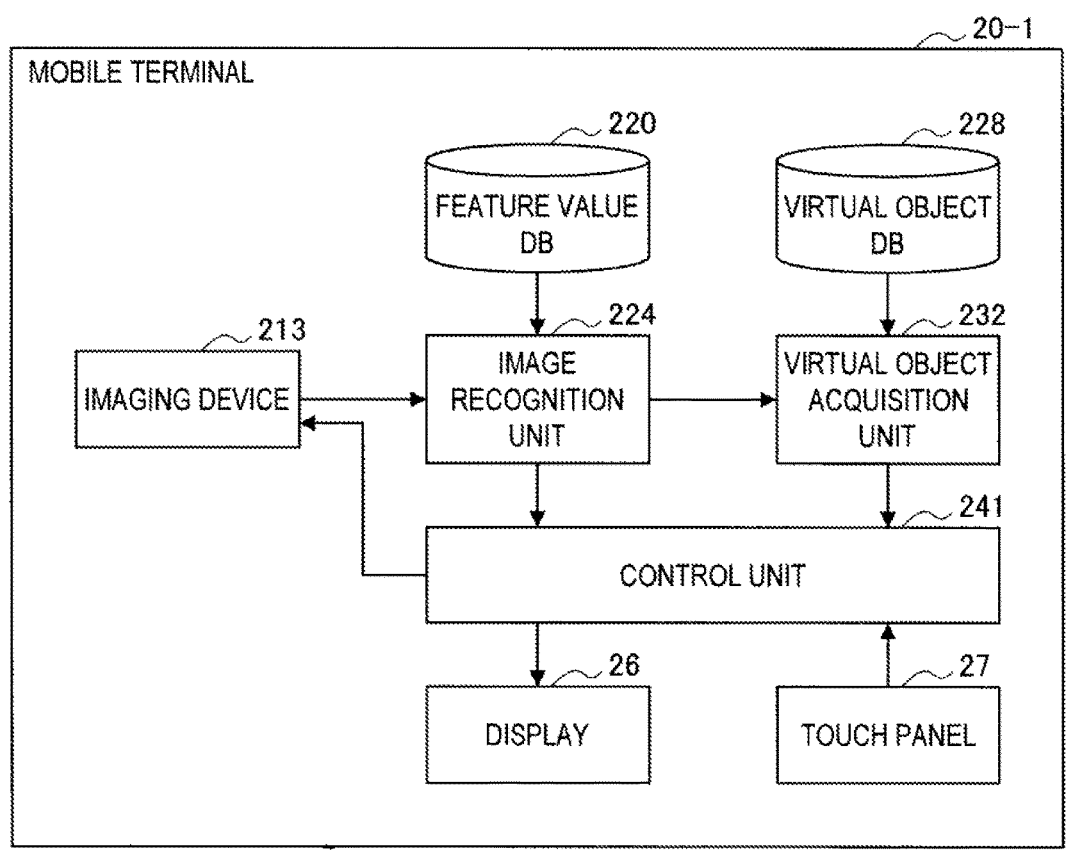

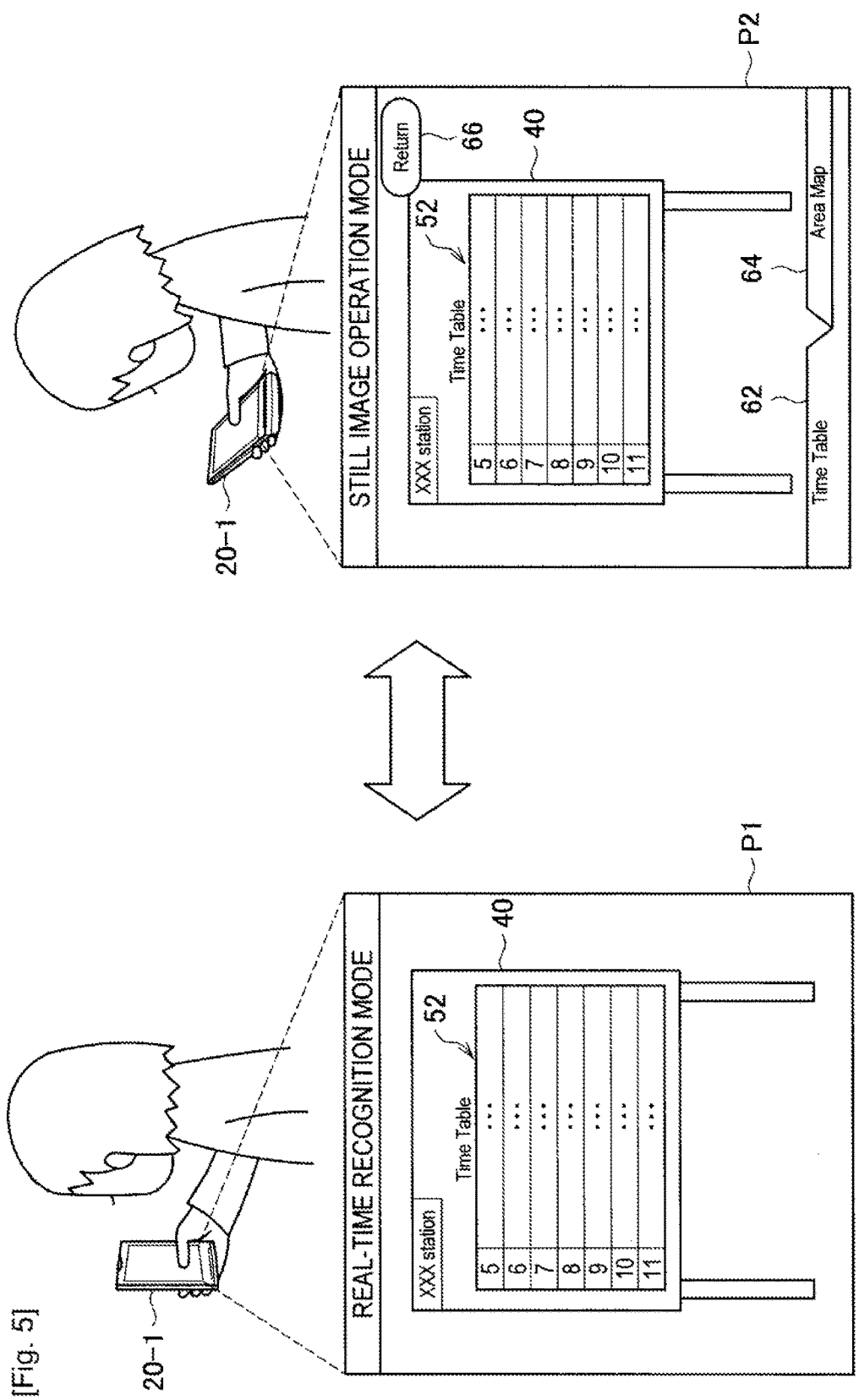
[Fig. 5]

[Fig. 6]
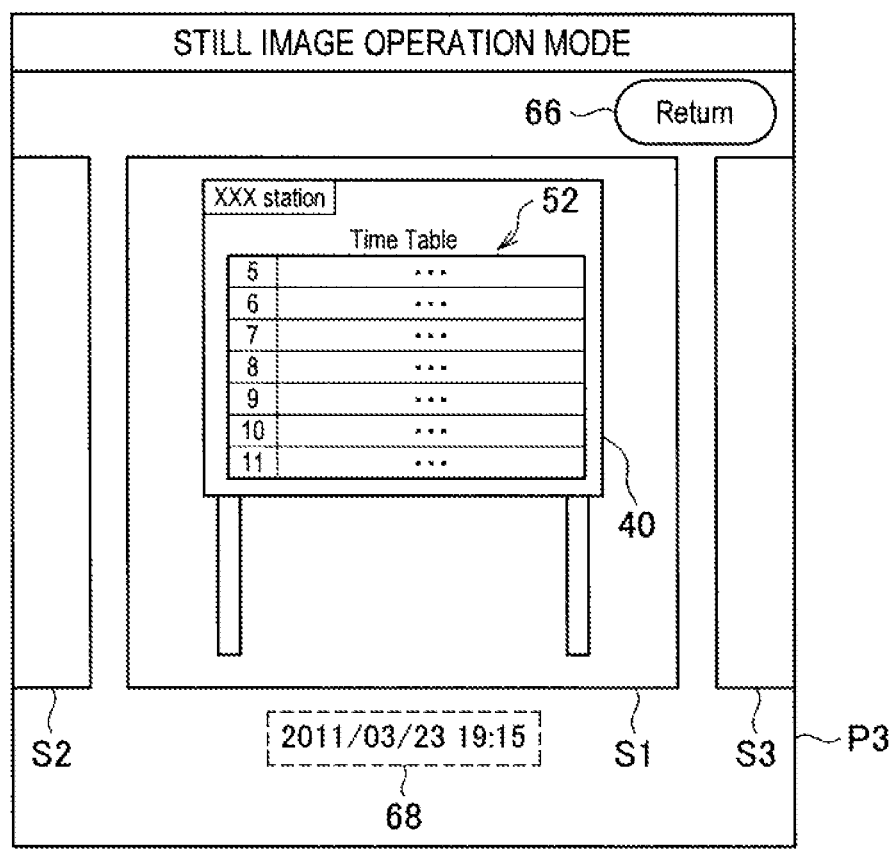

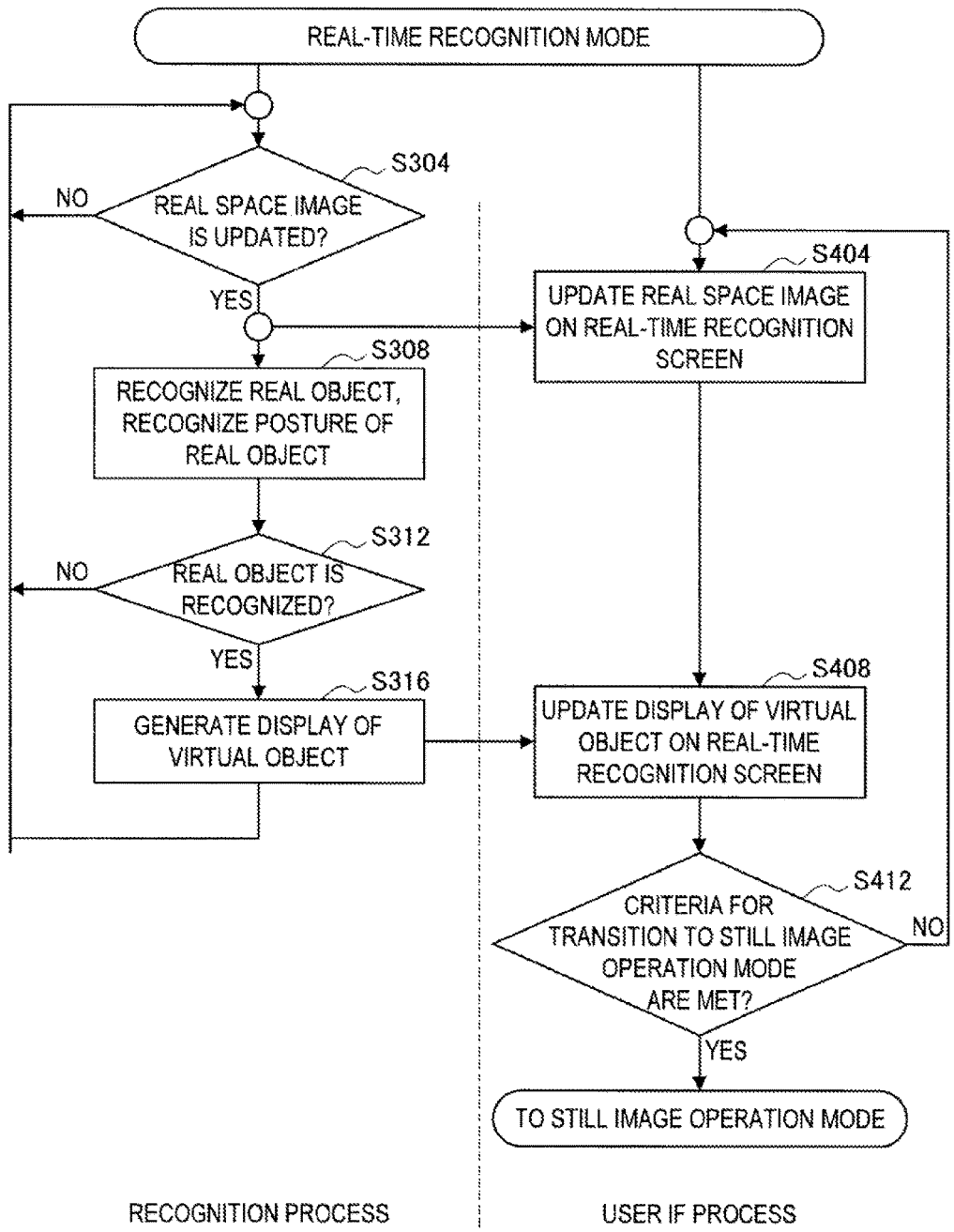

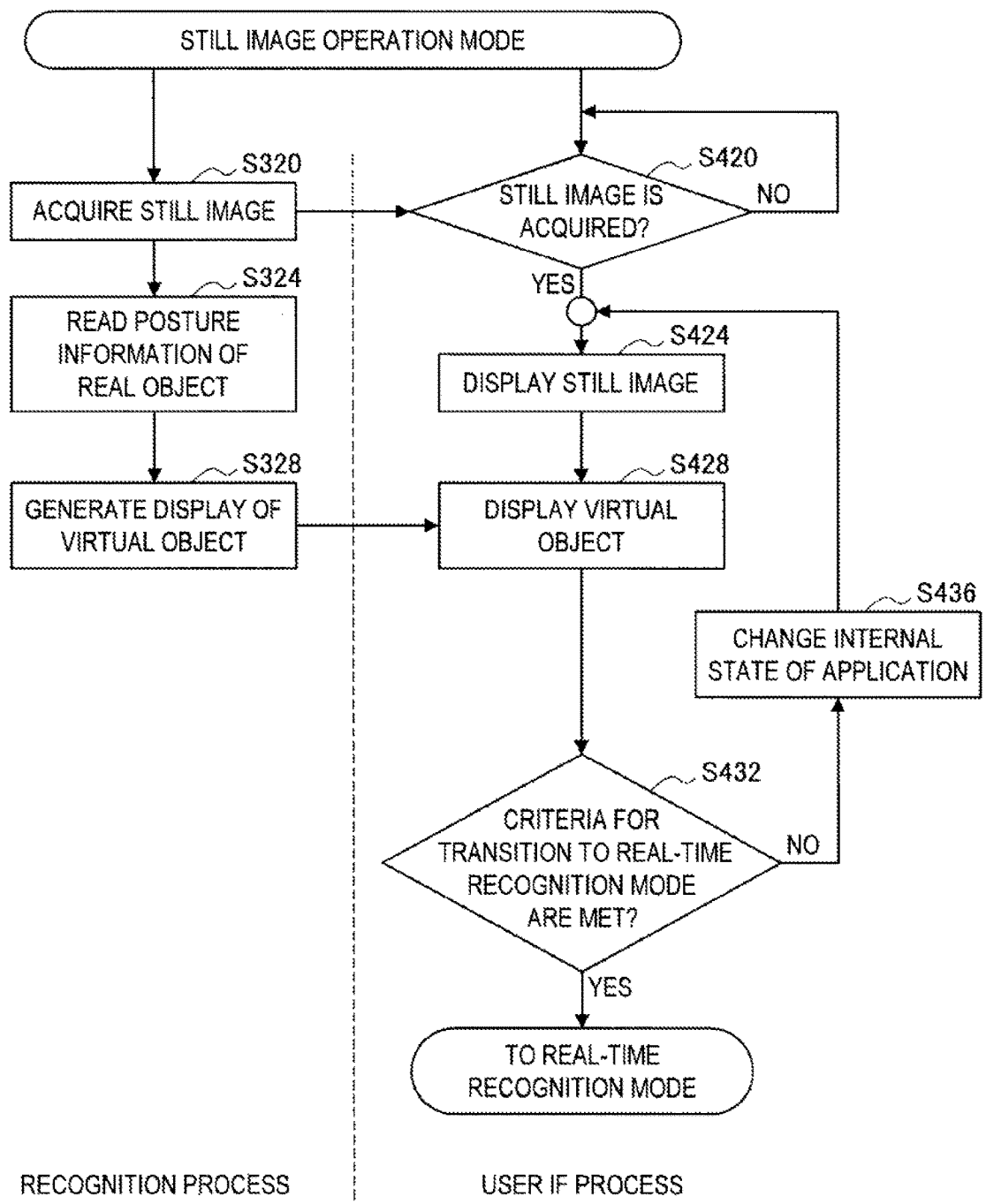
[Fig. 8]

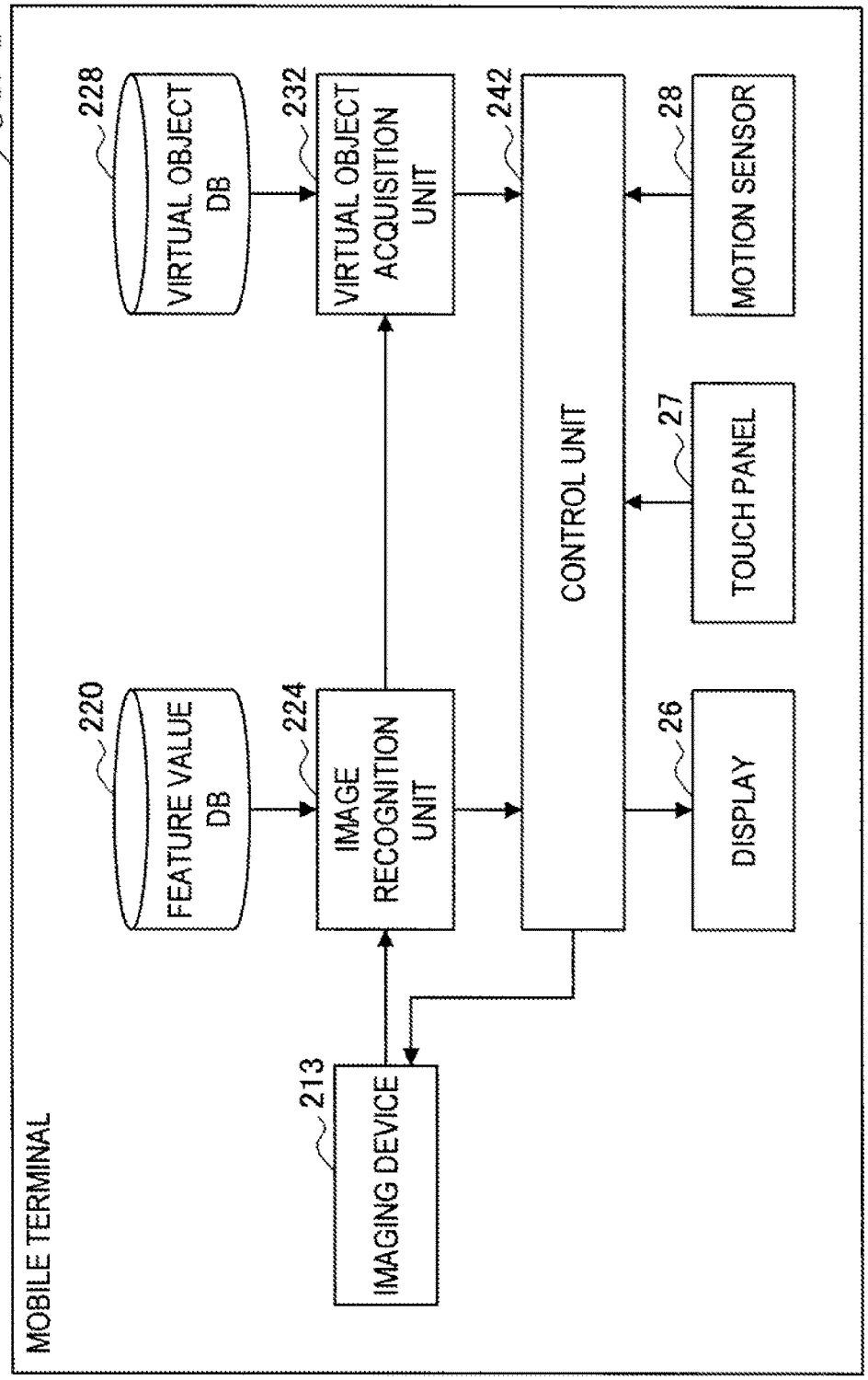
[Fig. 9]

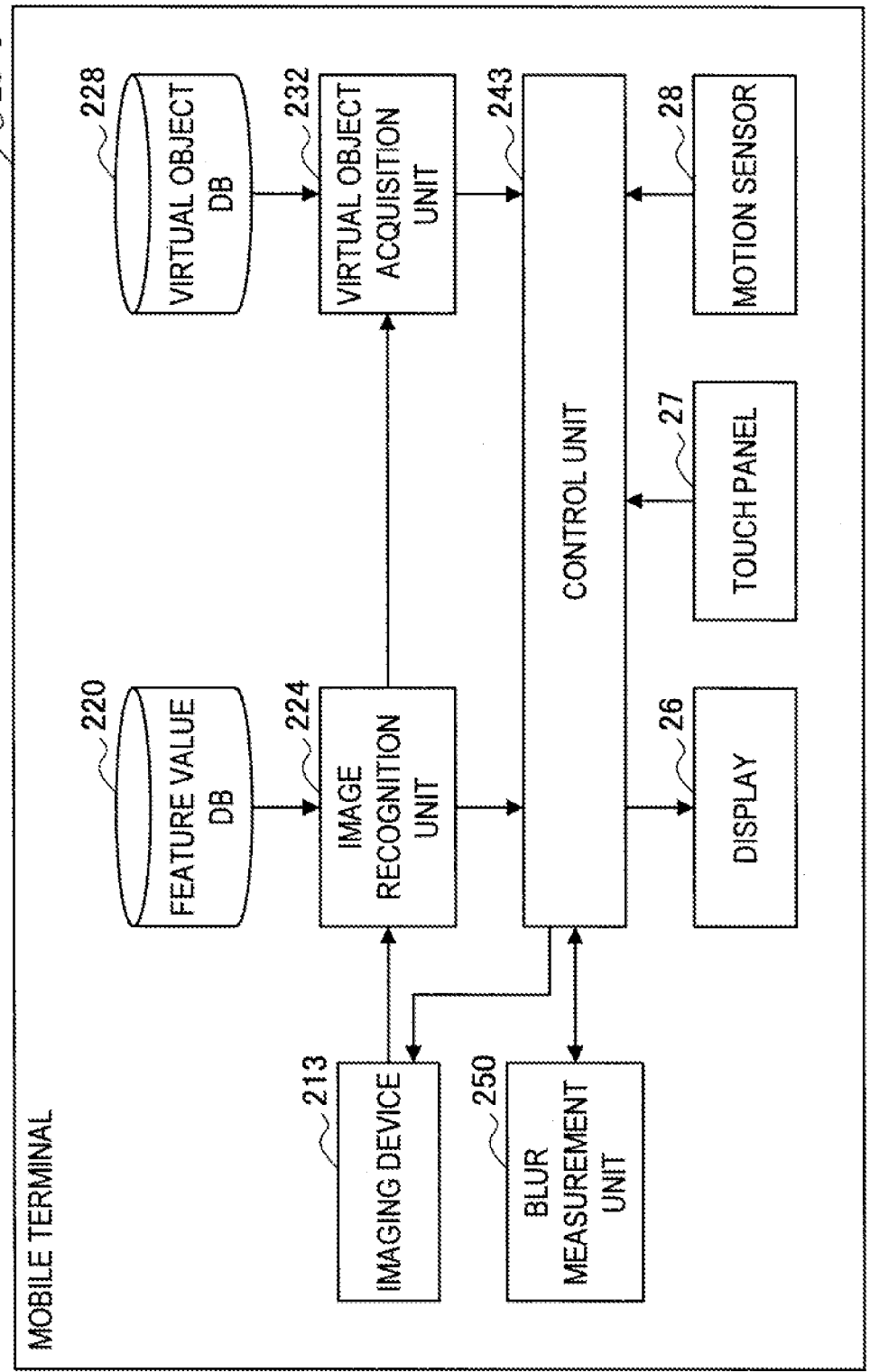
[Fig. 10]

[Fig. 11]
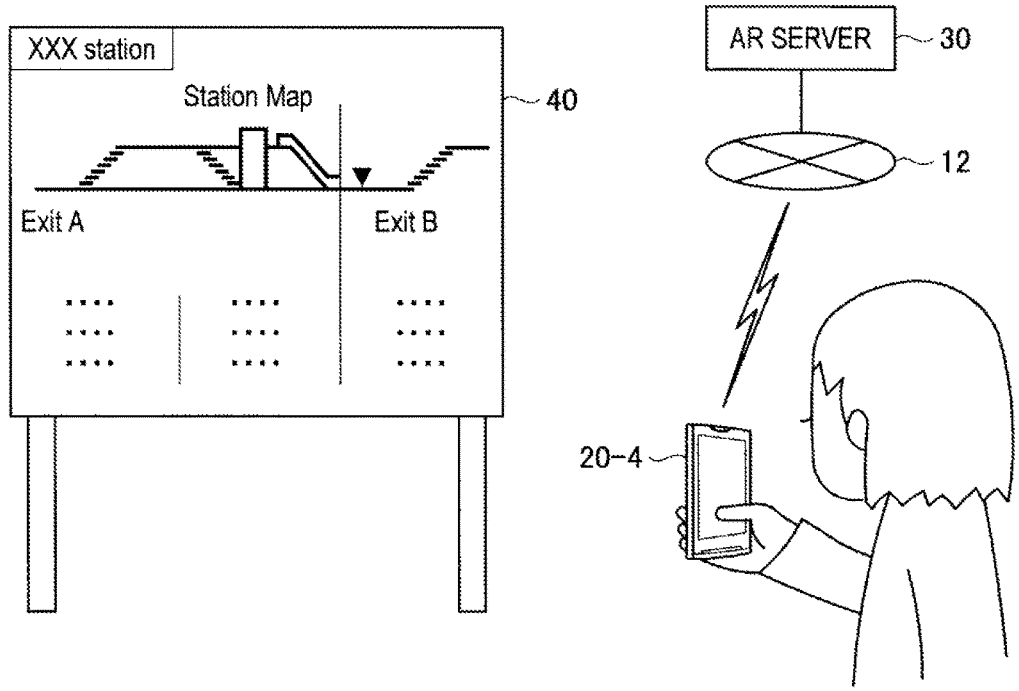

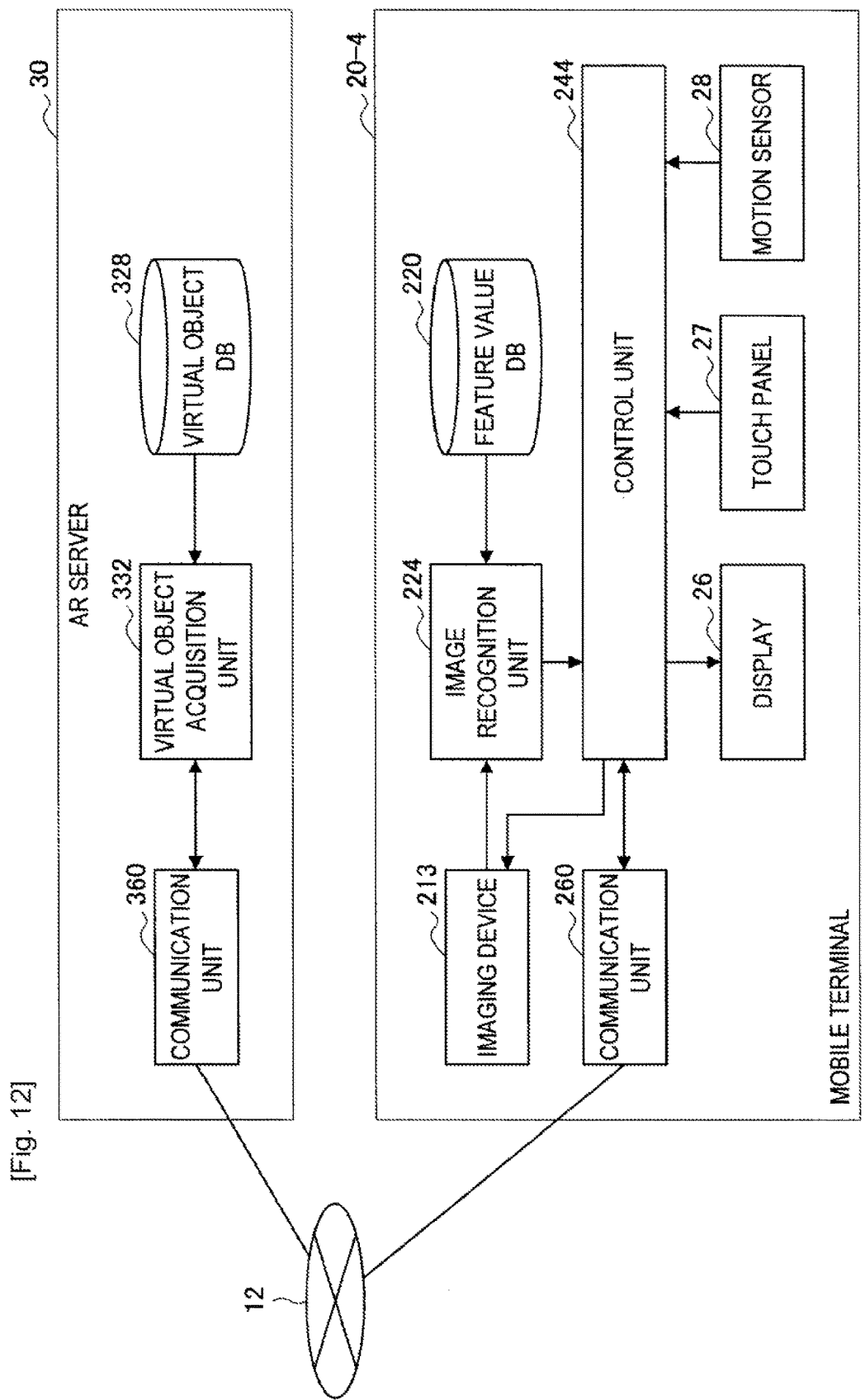
[Fig. 12]

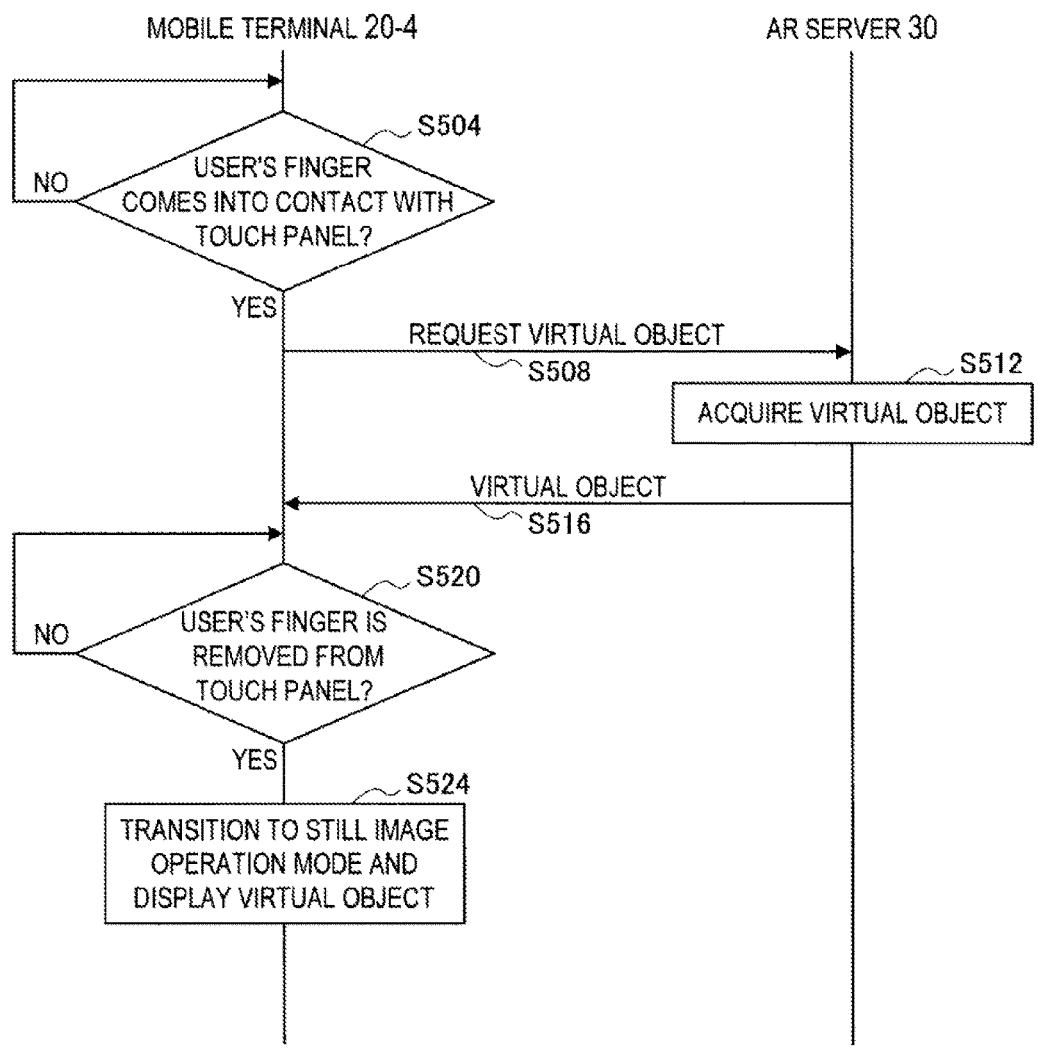

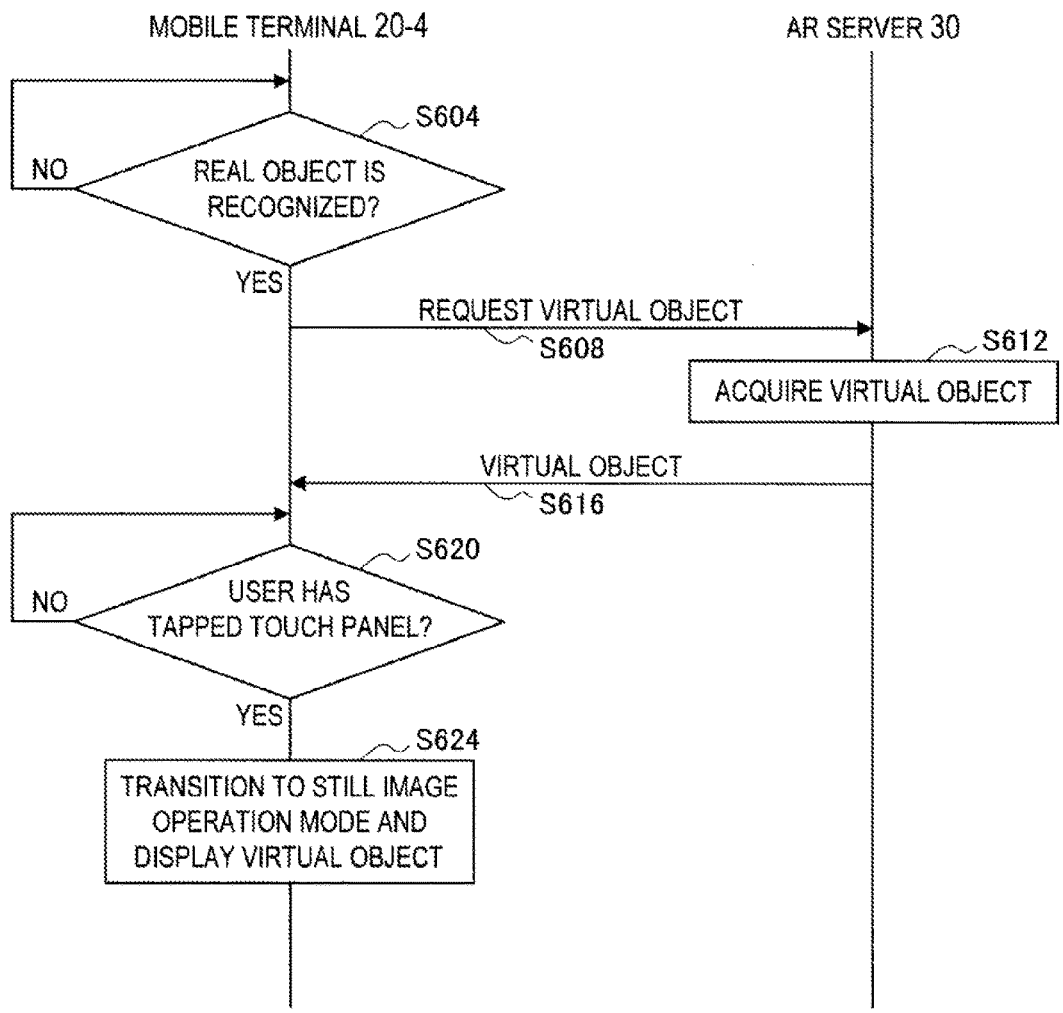
[Fig. 14]

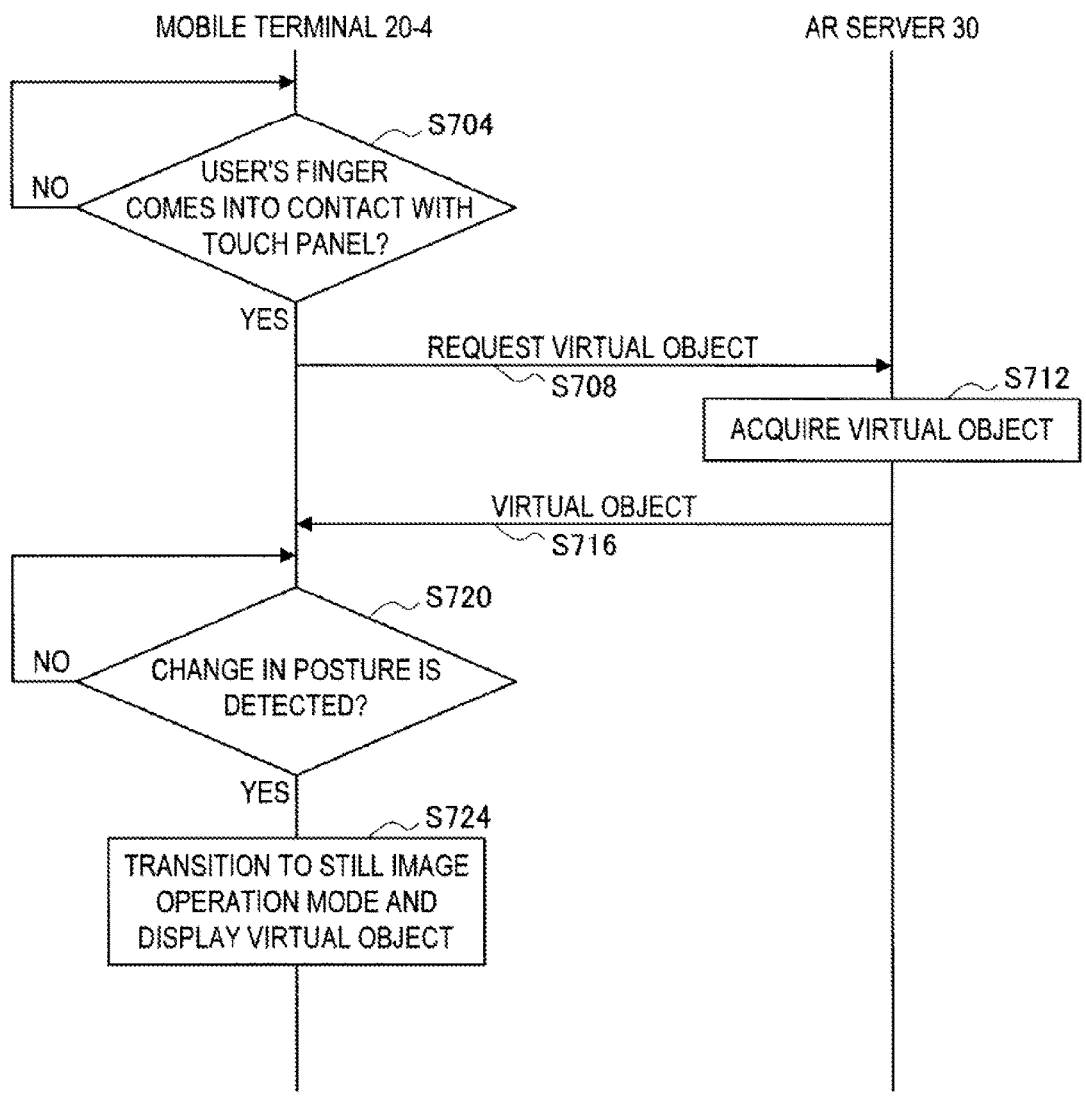

DISPLAY CONTROL DEVICE, DISPLAY CONTROL METHOD, AND PROGRAM

CROSS-REFERENCE TO RELATED APPLICATION

The present application is a continuation of U.S. application Ser. No. 14/006,856, filed Sep. 23, 2013, which is a national phase entry under 35 U.S.C. § 371 of International Application No. PCT/JP2012/001963 filed Mar. 22, 2012, published on Oct. 4, 2012, as WO 2012/132334 A1, which claims priority from Japanese Patent Application No. JP 2011-078072 filed in the Japanese Patent Office on Mar. 31, 2011.

TECHNICAL FIELD

The present disclosure relates to a display control device, a display control method, and a program.

BACKGROUND ART

Image recognition technology has become more advanced recently, enabling recognition of the position or posture of a real object (e.g. an object such as a sign board or building) contained in an input image from an imaging device. As one application example of such object recognition, AR (Augmented Reality) application is known. According to the AR application, it is possible to superimpose a virtual object (e.g. advertising information, navigation information, or information for a game) associated with a real object onto the real object contained in a real space image. Note that the AR application is disclosed in Patent Literature 1, for example.

SUMMARY

Technical Problem

When a user uses the AR application with a mobile terminal having an imaging function, the user can maintain the state where the virtual object is superimposed on the real space image by pointing the imaging direction of the mobile terminal toward the real object. However, it is burdensome for the user to maintain pointing the imaging direction toward the real object.

In light of the foregoing, the present disclosure proposes a novel and improved display control device, display control method and program that enable improvement of usability for a user.

Solution to Problem

According to an embodiment of the present disclosure, there is provided An apparatus including, a memory storing instructions; and a control unit configured to execute the instructions to: acquire an image of real space; detect an object of interest within the real space image; obtain a still image of the object; and display a virtual image relating to the object superimposed on the still image.

Further, according to another embodiment of the present disclosure, there is provided A method including: acquiring a plurality of images of real space; detecting an object of interest within the plurality of images; obtaining a still image of the object; and displaying a virtual image relating to the object superimposed on the still image.

Further, according to another embodiment of the present disclosure, there is provided A tangibly embodied non-transitory computer-readable medium storing instructions which, when executed by a processor, perform a method including acquiring a plurality of images of real space; detecting an object of interest within the plurality of images; obtaining a still image of the object; and displaying a virtual image relating to the object superimposed on the still image.

Advantageous Effects of Inventio]

As described above, the display control device, the display control method and the program according to embodiments of the present disclosure enable improvement of usability for a user.

BRIEF DESCRIPTION OF DRAWINGS

FIG. 1 is a view showing a configuration of an Augmented Reality (AR) system according to the present disclosure;

FIG. 2 is a view showing a example of a real-time recognition screen;

FIG. 3 is a view showing a hardware configuration of a mobile terminal;

FIG. 4 is a block diagram showing a configuration of a mobile terminal according to a first embodiment;

FIG. 5 is a view showing layouts of a real-time recognition screen and a still image operation screen;

FIG. 6 is a view showing an alternative example of a still image operation screen;

FIG. 7 is a flowchart showing an operation of a mobile terminal in real-time recognition mode;

FIG. 8 is a flowchart showing an operation of a mobile terminal in still image operation mode;

FIG. 9 is a block diagram showing a configuration of a mobile terminal according to a second embodiment;

FIG. 10 is a block diagram showing a configuration of a mobile terminal according to a third embodiment;

FIG. 11 is a view showing an AR system according to a fourth embodiment;

FIG. 12 is a functional block diagram showing configurations of a mobile terminal and an AR server according to the fourth embodiment;

FIG. 13 is a sequence chart showing a first operation example of the fourth embodiment;

FIG. 14 is a sequence chart showing a second operation example of the fourth embodiment; and FIG. 15 is a sequence chart showing a third operation example of the fourth embodiment;

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, structural elements having substantially the same function are distinguished by a different alphabetical letter affixed to the same reference numeral in some cases. However, when there is no particular need to distinguish between a plurality of structural elements having substantially the same function, they are denoted only by the same reference numeral.

Further, "Description of Embodiments" will be provided in the following order.
1. Overview of AR System
2. Description of Embodiments
2-1. First Embodiment
2-2. Second Embodiment
2-3. Third Embodiment
2-4. Fourth Embodiment
3. Summary Aspects of the present invention include an apparatus comprising a memory storing instructions and a control unit. The control unit may be configured to execute the instructions to: acquire an image of real space, detect an object of interest within the real space image, obtain a still image of the object. and display a virtual image relating to the object superimposed on the still image.

Aspects of the present invention include a method comprising acquiring a plurality of images of real space, detecting an object of interest within the plurality of images, and obtaining a still image of the object. The method may further comprise displaying a virtual image relating to the object superimposed on the still image.

Aspects of the present invention include a tangibly embodied non-transitory computer-readable medium storing instructions which, when executed by a processor, perform a method, The method may comprise acquiring a plurality of images of real space, detecting an object of interest within the plurality of images, obtaining a still image of the object, and displaying a virtual image relating to the object superimposed on the still image.

1. OVERVIEW OF AR SYSTEM

The AR system according to the present disclosure may be implemented in various embodiments as described in detail in "2-1. First Embodiment" to "2-4. Fourth Embodiment" by way of illustration. Further, the AR system according to each embodiment may include a display control device (mobile terminal 20, AR server 30) including:

A. a control unit (241-244) that may cause display of a display device to transition between a real space moving image containing a moving image of a real space and a, for example, composite image containing a still image of the real space and a virtual object corresponding to a real object contained in the still image.

Hereinafter, a basic configuration of the AR system common to each embodiment is described firstly with reference to FIGS. 1 and 2.

FIG. 1 is a view showing a configuration or an AR system according to the present disclosure. As shown in FIG. 1, the AR system according to the disclosure includes a mobile terminal 20 having an imaging function. The mobile terminal 20 can, for example, capture a real space image and display a virtual object corresponding to a real object contained in the real space image superimposed onto the real space image on a display 26. The real space image may include, for example, a plurality of images of real space. When the real space image includes a plurality of images of real space obtained periodically, the real space image is said to be a "live image." It is to be understood that the term "real space image," as used herein, encompasses a single still image of real space, a plurality of still images of real space, and a live image of real space.

For example, when the real object is a station board 40 as shown in FIG. 1, the mobile terminal 20 can capture a real space image containing the station board 40 and display a real-time recognition screen in which a virtual object corresponding to the station board 40 is superimposed on the display 26. The real-time recognition screen is specifically described hereinafter with reference to FIG. 2.

FIG. 2 is a view showing a example of the real-time recognition screen. As shown in FIG. 2, a real-time recognition screen P contains display of the station board 40, which is a real object, and a time table 52, which is a virtual object superimposed onto the station board 40. By looking at the real-time recognition screen in which the virtual object is superimposed, a user can obtain information which is not obtainable from the real space (in the case of FIG. 2, information about train schedule time, which is not written on the station board 40).

Further, a user can change display of the virtual object contained in the real-time recognition screen by conducting a predetermined operation on the display screen. For example, when an upward or downward slide operation is conducted by a user on the real-time recognition screen P shown in FIG. 2, the mobile terminal 20 may slide the subject of display in the time table 52 upward or downward.

Furthermore, when a plurality of virtual objects is associated with one real object, the mobile terminal 20 may switch the virtual object to be displayed among the plurality of virtual objects according to a user operation. For example, when a leftward or rightward slide operation is conducted by a user on the real-time recognition screen P shown in FIG. 2, the mobile terminal 20 may switch the virtual object to be superimposed onto the station board 40 to an area map or a route map.

Note that, although a smart phone is shown as an example of the mobile terminal 20 in FIG. 1, the mobile terminal 20 is not limited to the smart phone. For example, the mobile terminal 20 may be a PDA (Personal Digital Assistant), a mobile telephone, a portable music playback device, a portable video processing device, or a portable game machine. Further, the mobile terminal 20 is just an example of a display control device, and the display control device may be a server installed on the network side or in any other suitable configuration.

Further, although the station board 40 is shown as an example of the real object in FIGS. 1 and 2, the real object is not limited to the station board 40. For example, the real object may be the object of interest or, for example, the object may be a sign board, a building, a vehicle, a food product or a toy, or an identification pattern such as a QR code or an AR marker.

Incidentally, the above-described AR application that superimposes a virtual object onto a real space image is often, but not exclusively, executed by recognizing the captured real space image in real time. Therefore, a user can maintain the real-time recognition screen in which the virtual object is superimposed onto the real space image by pointing the imaging direction of the mobile terminal 20 toward the real object and maintaining the orientation for some period of time. However, it can be burdensome for the user to maintain pointing the imaging direction of the mobile terminal 20 toward the real object. Further, in the state where the imaging direction of the mobile terminal 20 is pointed toward the real object, it is difficult to conduct an operation for changing display of the virtual object.

Given such and other circumstances, embodiments of the present disclosure have been invented. According to the embodiments of the disclosure, it is possible to improve the usability and operability of the mobile terminal 20. Hereinafter, after the hardware configuration of the mobile terminal 20 is described, the embodiments of the present disclosure are sequentially described in detail.

Hardware Configuration of Mobile Terminal

FIG. 3 is an explanatory view showing the hardware configuration of the mobile terminal 20. As shown in FIG. 3, the mobile terminal 20 includes a CPU (Central Processing Unit) 201, a ROM (Read Only Memory) 202, a RAM (Random Access Memory) 203, an input device 208, an output device 210, a storage device 211, a drive 212, an imaging device 213, and a communication device 215.

The CPU 201 may serve both as a processing device and a control device, and it controls the overall operations in the mobile terminal 20 according to various kinds of programs. The CPU 201 may be a microprocessor. The ROM 202 stores a program to be used by the CPU 201, processing parameters and the like. The RAM 203 may temporarily stores a program to be used in the execution on the CPU 201, parameters that vary in the execution and the like. The CPU 201, the ROM 202 and the RAM 203 are connected through the host bus, which may be, for example, a CPU bus and the like.

The input device 208 may be composed of an input means for a user to input information, such as a mouse, a keyboard, a touch panel, a button, a microphone, a switch or a lever, and an input control circuit that generates an input signal based on a user input and outputs it to the CPU 201, for example. A user of the mobile terminal 20 manipulates the input device 208 to thereby input various kinds of data or direct a processing operation to the mobile terminal 20.

The output device 210 includes a display device such as a LCD (Liquid Crystal Display) device, an OLED (Organic Light Emitting Diode) device or a lamp. Further, the output device 210 includes a sound output device such as a speaker or a headphone. For example, the display device displays captured images, generated images and the like. On the other hand, the sound output device may convert sound data and the like into sound and outputs the sound.

The storage device 211 is a device whose functions may include data storage that may be configured as an example of a storage unit of the mobile terminal 20 according to the embodiment. The storage device 211 may include a storage medium, a recording device that records data into the storage medium, a reading device that reads data from the storage medium, a deleting device that deletes data recorded in the storage medium and the like. The storage device 211 may store a program to be executed by the CPU 201 and various data.

The drive 212 is a reader/writer for a storage medium, and it may be built in the mobile terminal 20 or attached externally. The drive 212 may read information that is recorded on a removable storage medium 24 such as a magnetic disk, an optical disk, a magneto-optical disk or a semiconductor memory which is attached thereto, and outputs the information to the RAM 203. Further, the drive 212 may write information into the removable storage medium 24.

The imaging device 213 may include an imaging optical system such as a taking lens or a zoom lens that condenses light, and a signal converter such as a CCD (Charge Coupled Device) or a CMOS (Complementary Metal Oxide Semiconductor). The imaging optical system condenses light emitted from a subject and forms a subject image on the signal converter, and the signal converter converts the formed subject image into an electrical image signal.

The communication device 215 is a communication interface composed of a communication device or the like to make a connection with the network 12, for example. The communication device 215 may be a communication device compatible with a wireless LAN (Local Area Network), a communication device compatible with LTE (Long Term Evolution), or a wired communication device that makes wired communication.

Note that the network 12 may be a wired or wireless transmission channel of information transmitted from a device connected with the network 12. For example, the network 12 may include a public network such as the Internet, a telephone line network or a satellite communications network, various kinds of LAN (Local Area Network) including Ethernet (registered trademark), WAN (Wide Area Network) and the like. Further, the network 12 may include a leased line network such as IP-VPN (Internet Protocol-Virtual Private Network).

2. DESCRIPTION OF EMBODIMENTS

An exemplary configuration of the AR system according to the present disclosure is described above with reference to FIGS. 1 to 3. Hereinafter, a first embodiment to a fourth embodiment according to the present disclosure are described in detail with reference to FIGS. 4 to 15.

2-1. First Embodiment (Configuration of Mobile Terminal)

FIG. 4 is a functional block diagram showing a configuration of a mobile terminal 20-1 according to the first embodiment. As shown in FIG. 4, the mobile terminal 20-1 according to the first embodiment includes a display 26, a touch panel 27, an imaging device 213, a feature value DB 220, an image recognition unit 224, a virtual object DB 228, a virtual object acquisition unit 232, and a control unit 241.

The display 26 may include a display module composed of LCD, OLED or the like. The display 26 displays various screens according to control by the control unit 241. For example, the display 26 displays a real-time recognition screen that contains a moving image of a real space being captured by the imaging device 213, a still image operation screen, which is a composite image of a still image of the real space and a virtual object corresponding to a real object contained in the still image and the like. Note that, however, the real-time recognition screen is just an example of a real space moving image containing a moving image of a real space, and the real space moving image may contain a moving image of a real space captured prior to the display of the virtual and/or real images.

Further, although an example in which the display 26 is mounted as a part of the mobile terminal 20-1 is shown in FIG. 4, the display 26 may be a separate member from the mobile terminal 20-1. Further, the display 26 may be HMD (Head Mounted Display) that is mounted on the head of a user.

The touch panel 27 is an operation detection unit that is mounted onto the display 26. The touch panel 27 can detect the proximity or contact of an operating body such as a user's finger or a touch pen. Note that the touch panel 27 is just an example of an operation detection unit, and the mobile terminal 20-1 may include another component for operation, such as a keyboard and a button.

The imaging device 213 may include an imaging optical system and a signal converter as described above with reference to FIG. 3, and captures real space images (moving images or still images) according to control by the control unit 241. Note that the imaging device 213 may include a component for imaging of moving images and a component for imaging of still images separately.

The feature value DB 220 is a database that stores feature value data of images of real objects. Specifically, in the feature value DB 220, identification information for identifying each real object and feature value data of each real object are associated with each other. The feature value data may be a set of feature values determined from learning images of real objects using SIFT or Random Ferns, for example.

The image recognition unit 224 may recognize a real object contained in the real space image captured by the imaging device 213, and the position and posture of the real object in the real space image. For example, the image recognition unit 224 recognizes a real object contained in the real space image by checking a feature value determined from the real space image against the feature value of each real object stored in the feature value DB 220. Specifically, the image recognition unit 224 may determine a feature value of a real object in the real space image according to a feature value determination method such as SIFT or Random Ferns, and checks the determined feature value against the feature value of each real object stored in the database 220. Then, the image recognition unit 224 recognizes the identification information of the real object associated with the feature value which most matches the feature value of the real object in the real space image, and the position and posture of the real object in the real space image.

Note that the image recognition unit 224 may recognize a real object such as, for example, a known figure or symbol, an artificial marker (e.g. a bar code or a QR code) or a natural marker and recognize the position and posture of the real object based on the size and shape of the real object in the real space image.

Further, although an example in which a real object contained in a real space image is recognized by image processing is described above, a method of recognizing a real object is not limited to the image processing. For example, it is feasible to detect a direction toward which the imaging device 213 is pointed and the current position of the mobile terminal 20-1, and estimate a real object contained in a real space image and the position and posture of the real object in the real space image based on a detection result.

The virtual object DB 228 is a database that stores virtual objects to be superimposed onto real objects. Specifically, in the virtual object DB 228, identification information of a virtual object, identification information of a real object, setting information indicating a display position relative to the real object and a posture, and a virtual object to be presented to a user are associated with one another. The virtual object may be in text format or image format.

The virtual object acquisition unit 232 may acquire the virtual object and the setting information corresponding to the real object recognized by the image recognition unit 224. For example, the virtual object acquisition unit 232 acquires the virtual object and the setting information associated with the identification information of the real object recognized by the image recognition unit 224 from the virtual object DB 228.

The control unit 241 controls the overall operation of the mobile terminal 20-1. For example, the control unit 241 causes the operating mode of the mobile terminal 20-1 to transition among a plurality of operating modes including real time recognition mode and still image operation mode according to predetermined criteria for transition.

The real time recognition mode is an operating mode that may recognize a real object contained in a moving image of a real space captured by the imaging device 213 in real time and creates the real-time recognition screen by superimposing a virtual object onto the real object. On the other hand, the still image operation mode is an operating mode that creates the still image operation screen by superimposing a virtual object onto a still image captured by the imaging device 213. Note that the control unit 241 can change display of the virtual object based on a user operation in any operating mode. Specifically, the control unit 241 can move, zoom in/out or scroll a virtual object based on a user operation. The above-described still image in the still image operation mode may be, for example, one frame that constitutes a moving image captured by the component for imaging of moving images or a still image captured by the component for imaging of still images. Further, the above-described still image may be one still image composed of a plurality of still images captured. For example, when the mobile terminal 20-1 has a function of combining a plurality of still images into a magnified still image (such as "Swing Panorama" function that combines a plurality of still images captured with the direction of the imaging device shifted in steps into one panorama picture), the mobile terminal 20-1 can superimpose a virtual object onto one magnified still image in the still image operation mode. In this case, a user operation can be also performed on one magnified still image. Further, the mobile terminal 20-1 may display the still image which has been captured most recently on the initial still image operation screen, and when a user operation indicates the direction which opposes to the motion of the imaging device (such as drag to the direction opposite to the swing direction), further display the past still image (which is spatially adjacent) with a wider angle of view in addition to the still image being displayed. In this case, it is feasible to move a virtual object from the region of the most recent still image to the region of the past still image according to a user operation. The synthesis of the magnified still image may be made based on the analysis of the contents of each image or based on the position and posture of the imaging device measured by a sensor at time of capturing each image.

Layout Examples of Real-Time Recognition Screen and Still Image Operation Screen Layouts of the real-time recognition screen and the still image operation screen are described hereinafter with reference to FIG. 5. As shown in FIG. 5, a real-time recognition screen P1 which is created in the real time recognition mode contains display of the station board 40, which is a real object, and the time table 52, which is a virtual object superimposed onto the station board 40. In order to maintain the real-time recognition screen P1, a user may maintain pointing the imaging direction of the mobile terminal 20-1 toward the station board 40 as shown in FIG. 5.

On the other hand, a still image operation screen P2 which is created in the still image operation mode contains display of the station board 40, which is a real object, the time table 52, which is a virtual object superimposed onto the station board 40, a tab "Time Table" 62, a tab "Area Map" 64, and a return key 66.

The control unit 241 may change the virtual object to be displayed according to a user operation on the tab "Time Table" 62, the tab "Area Map" 64 and the like. For example, when the tab "Area Map" 64 is selected by a user, the control unit 241 changes the virtual object to be superimposed onto the station board 40 from the time table 52 to the area map.

In the still image operation mode, the still image operation screen P2 containing the virtual object can be displayed without a need for a user to point the imaging direction of the mobile terminal 20-1 toward the real object as shown in FIG. 5. It is thereby possible to improve the usability of the mobile terminal 20-1 for the user and the operability of display of the virtual object.

Note that the return key 66 is an example of a transition operation button, and, when the return key 66 is entered by a user, for example, the control unit 241 causes the operating mode to transition from the still image operation mode to the real time recognition mode.

FIG. 6 is an explaining embodiment view showing an alternative example of the still image operation screen. A still image operation screen P3 according to an alternative example contains a plurality of thumbnails (S1, S2, S3, . . . ), a return key 66 and additional information 68 for each thumbnail. The control unit 241 can accept a thumbnail selection operation on the still image operation screen P3 and display the selected thumbnail as a main item. Note that the plurality of thumbnails may be a plurality of frames that constitute the moving image obtained in the real time recognition mode. Further, each thumbnail may be a composite image of a still image of the real space and a virtual object, or a still image of the real space not containing a virtual object.

Criteria for Transition of Operating Mode

Transition criteria for the control unit 241 to determine whether to cause the operating mode to transition or not are described hereinafter.

First, criteria for transition from the real time recognition mode to the still image operation mode may be any one of the following criteria or a combination of the following criteria.

(1-1) A real object is recognized by the image recognition unit 224 in the real time recognition mode
(1-2) An operating body such as a user's finger comes into contact with the touch panel 27.
(1-3) An operating body is removed from the touch panel 27.
(1-4) Contact or removal of an operating body with or from the touch panel 27 is detected within a judgment range of a real object.

Accordingly, the control unit 241 may cause the operating mode to transition to the still image operation mode when a real object is recognized by the image recognition unit 224 and contact of an operating body with the touch panel 27 is detected within the judgment range of the real object, for example. Note that, as an additional explanation of the judgment range of the real object, the judgment range of the real object is a range related to a recognition range of the real object, which may be a range including the recognition range of the real object, or a part of the recognition range of the real object. When a user conducts an operation within the judgment range of the real object, the control unit 241 judges that the real object is selected even if it is outside the recognition range of the real object.

Note that the control unit 241 may use a real space image which is obtained at a point when the criteria for transition to the still image operation mode are met as a still image of the still image operation screen or may use a real space image which is obtained after the criteria for transition to the still image operation mode are met as a still image of the still image operation screen. In the latter case, the control unit 241 may direct the imaging device 213 to capture a still image using the component for imaging of still images.

Next, criteria for transition from the still image operation mode to the real time recognition mode may be any one of the following criteria or a combination of the following criteria.

(2-1) An operating body such as a user's finger comes into contact with the touch panel 27.
(2-2) An operating body is removed from the touch panel 27.
(2-3) Contact or removal of an operating body with or from the touch panel 27 is detected outside a judgment range of a real object.
(2-4) The return key 66 is entered.

Accordingly, the control unit 241 may cause the operating mode to transition to the real time recognition mode when contact of an operating body with the touch panel 27 is detected outside the judgment range of the real object, for example.

As described above, because the mobile terminal 20-1 according to the first embodiment has the still image operation mode, it is possible to display the still image operation screen in which a virtual object is superimposed onto a still image of the real space on the display 26 without a need for a user to keep pointing the imaging direction of the mobile terminal 20-1 toward the real object. It is thereby possible to improve the usability of the mobile terminal 20-1 for the user and the operability of display of the virtual object.

(Operation of Mobile Terminal)

An operation of the mobile terminal 20-1 according to the first embodiment is described hereinafter with reference to FIGS. 7 and 8. As shown in FIGS. 7 and 8, the mobile terminal 20-1 can execute the recognition process and the user IF process in a parallel fashion.

FIG. 7 is a flowchart showing an operation of the mobile terminal 20-1 in the real-time recognition mode. As shown in FIG. 7, in the real time recognition mode, the image recognition unit 224 first determines whether a real space image which is input from the imaging device 213 is updated or not (S304). When the real space image is updated, the image recognition unit 224 attempts to recognize a real object contained in the real space image and recognize the posture of the real object (S308). When the real object is recognized in S308, the virtual object acquisition unit 232 acquires a virtual object corresponding to the real object from the virtual object DB 228, and the control unit 241 generates display of the virtual object acquired by the virtual object acquisition unit 232 (S316). Note that, when it is determined that the real space image is not updated (NO in S304), when the real object is not recognized in S308 (NO in S312), or after the processing of S316, the processing from S304 is repeated.

On the other hand, when it is determined that the real space image is updated in S304, the control unit 241 updates the real space image in the real-time recognition screen (S404). Further, when display of the virtual object is generated in S316, the control unit 241 may update display of the virtual object in the real-time recognition screen (S408). Then, when the criteria for transition to the still image operation mode are met, the control unit 241 causes the operating mode of the mobile terminal 20-1 to transition to the still image operation mode (S412).

FIG. 8 is a flowchart showing an operation of the mobile terminal 20-1 in the still image operation mode. As shown in FIG. 8, in the still image operation mode, the control unit 241 first acquires a still image (S320), and reads posture information of the real object recognized in S308 regarding the still image (S324). Note that, in the case of newly capturing a still image for the still image operation screen, recognition of the posture of a real object contained in the new still image may be performed. Then, the control unit 241 generates display of a virtual object corresponding to the real object which is acquired by the virtual object acquisition unit 232 (S328).

On the other hand, when a still image is acquired in S320 (S420), the control unit 241 displays the still image on the display 26 (S424). Further, the control unit 241 displays the display of the virtual object generated in S328 on the display 26 (S428). Then, when the criteria for transition to the real time recognition mode are met, the control unit 241 causes the operating mode of the mobile terminal 20-1 to transition to the real time recognition mode (S432). On the other hand, when a user operation which is not an operation to indicate mode transition is detected, the control unit 241 changes the internal state of an application according to the user operation (S436) and repeats the processing from S424.

2-2. Second Embodiment

Hereinafter, a second embodiment of the present disclosure is described. Although an explicit operation such as contact or removal of a user's finger with or from the touch panel 27 is described as the criteria for transition of the operating mode in the first embodiment, other criteria for transition of the operating mode are proposed in the second embodiment.

FIG. 9 is a functional block diagram showing a configuration of a mobile terminal 20-2 according to the second embodiment. As shown in FIG. 9, the mobile terminal 20-2 according to the second embodiment includes a display 26, a touch panel 27, a motion sensor 28, an imaging device 213, a feature value DB 220, an image recognition unit 224, a virtual object DB 228, a virtual object acquisition unit 232, and a control unit 242. The functions of the display 26, the touch panel 27, the imaging device 213, the feature value DB 220, the image recognition unit 224, the virtual object DB 228, and the virtual object acquisition unit 232 are the same as those described in the first embodiment, and the elements different from those in the first embodiment are mainly described below.

The motion sensor 28 is a sensor that detects the motion of the mobile terminal 20-2. For example, the motion sensor 28 detects accelerations in the X-axis direction, the Y-axis direction and the Z-axis direction (Gx, Gy, Gz) which may be orthogonal to one another. Note that, however, the target of detection of the motion sensor 28 is not limited to accelerations in three dimensions. For example, when the relative positions of the imaging device 213 and the motion sensor 28 are known, the target of detection of the motion sensor 28 may be an acceleration in one dimension or accelerations in two dimensions. Further, the motion sensor 28 may be a gyro sensor.

The control unit 242 has a function of controlling the transition of the operating mode based on the detection result of the motion by the motion sensor 28, in addition to all or some of the functions of the control unit 241 according to the first embodiment. This is described below.

In use a user may hold up the mobile terminal 20-2 toward the real object as shown on the left of FIG. 5 in the real-time recognition mode. On the other hand, in the still image operation mode, a user may hold the mobile terminal 20-2 at the correct position with respect to the downward line of sight of a user as shown on the right of FIG. 5. Specifically, the position and posture of the mobile terminal 20-2 in the real-time recognition mode and the position and posture of the mobile terminal 20-2 in the still image operation mode may be different.

From this point of view, in the second embodiment, a motion to be given to the mobile terminal 20-2 by a user at the time of mode transition is perceived as a mode transition operation, and the control unit 242 causes the operating mode of the mobile terminal 20-2 to transition based on the detection result of a motion by the motion sensor 28.

For example, when each or one or more of the amplitude components of the motion detection result (Gx, Gy, Gz) by the motion sensor 28 varies by the value more than a set value within a predetermined period of time, the control unit 242 may cause the operating mode of the mobile terminal 20-2 to transition.

Alternatively, the control unit 242 may cause the operating mode to transition from the real time recognition mode to the still image operation mode when a first motion pattern is detected by the motion sensor 28, and cause the operating mode to transition from the still image operation mode to the real time recognition mode when a second motion pattern different from the first motion pattern is detected by the motion sensor 28. The first motion pattern may be a pattern in which the mobile terminal 20-2 may be moved from the state of being held up to the state of being at the correct position with respect to the downward line of sight of a user in accordance with actual use case. Further, the second motion pattern may be the reverse motion pattern of the first motion pattern.

However, the motion patterns serving as criteria for transition are not limited to the above example, and various motion patterns may be defined as criteria for transition. For example, various motion patterns including motion patterns in which the mobile terminal 20-2 is swung, rotated and the like can be defined as criteria for transition.

Further, the control unit 242 may control the transition of the operating mode according to the AND or OR of the above-described criteria for transition related to a motion and the criteria for transition described in the first embodiment. For example, the control unit 242 may cause the operating mode to transition to the still image operation mode when a user's finger comes into contact with the touch panel 27 (1-2) and the first motion pattern is detected by the motion sensor 28. Likewise, the control unit 242 may cause the operating mode to transition to the real time recognition mode when a user's finger comes into contact with the touch panel 27 (2-1) and the second motion pattern is detected by the motion sensor 28.

As described above, according to the second embodiment, the motion which is expected to be given to the mobile terminal 20-2 by a user at the time of mode transition is used as criteria for transition, thereby reducing the load of a user operation for mode transition.

Note that there may be a case where a real object which attracts user's interest is not contained in the real space image captured at the time when a motion which meets criteria for transition is detected by the motion sensor 28. In light of this, the mobile terminal 20-2 according to the second embodiment may store the real space image captured during a predetermined period in the past and use the real space image before a motion which meets criteria for transition is detected by the motion sensor 28 as a still image for the still image operation screen. Particularly, it is effective to use the real space image at the start of the motion pattern as a still image for the still image operation screen.

2-3. Third Embodiment

Hereinafter, a third embodiment of the present disclosure is described. In the third embodiment of the disclosure, a configuration for using a higher quality still image for the still image operation screen is proposed.

FIG. 10 is a functional block diagram showing a configuration of a mobile terminal 20-3 according to the third embodiment. As shown in FIG. 10, the mobile terminal 20-3 according to the third embodiment includes a display 26, a touch panel 27, a motion sensor 28, an imaging device 213, a feature value DB 220, an image recognition unit 224, a virtual object DB 228, a virtual object acquisition unit 232, and a control unit 243, and a blur measurement unit 250. The functions of the display 26, the touch panel 27, the motion sensor 28, the imaging device 213, the feature value DB 220, the image recognition unit 224, the virtual object DB 228, and the virtual object acquisition unit 232 are the same as those described in the second embodiment, and the elements different from those in the second embodiment are mainly described below.

The blur measurement unit 250 is a quality measurement unit that buffers moving images of the real space captured by the imaging device 213 in the real time recognition mode and detects a blur of each of the past N frames at the transition from the real time recognition mode to the still image operation mode. For example, the blur measurement unit 250 may transform image data of each frame into a frequency component by discrete cosine transform and measure the blur of each frame from the frequency component of the image data.

The control unit 243 has a function of selecting a still image for the still image operation screen, in addition to all or some of the functions of the control unit 242 according to the second embodiment. For example, the control unit 243 may select a frame with the least blur among the past N frames based on the measurement result by the blur measurement unit 250 and uses the selected frame as a still image for the still image operation screen. This configuration enables display of a still image with good quality on the still image operation screen.

Note that the mobile terminal 20-3 may store a real object and the posture of the real object which have been recognized for each frame by the image recognition unit 224 as a recognition result of each frame, and the control unit 243 may generate the still image operation screen using the recognition result stored for the selected frame.

2-4. Fourth Embodiment

Hereinafter, a fourth embodiment of the present disclosure is described. Although an example in which a mobile terminal implements AR alone is described in the first to third embodiments, a mobile terminal and a server installed on the network side may implement AR in combination.

FIG. 11 is a view showing an AR system according to the fourth embodiment. As shown in FIG. 11, the AR system according to the fourth embodiment includes a mobile terminal 20-4, a network 12, an AR server 30, and a station board 40, which is an example of a real object. Configurations of the mobile terminal 20-4 and the AR server 30 are described specifically with reference to FIG. 12.

FIG. 12 is a block diagram showing configurations of the mobile terminal 20-4 and the AR server 30 according to the fourth embodiment. As shown in FIG. 12, the mobile terminal 20-4 according to the fourth embodiment includes a display 26, a touch panel 27, a motion sensor 28, an imaging device 213, a feature value DB 220, an image recognition unit 224, a control unit 244, and a communication unit 260. The display 26, the touch panel 27, the motion sensor 28, the imaging device 213, the feature value DB 220 and the image recognition unit 224 are the same as those described in the first to third embodiments, and the elements different from those in the first to third embodiments are mainly described below.

The communication unit 260 is an interface with the AR server 30, and it may act as a transmitting unit that transmits information to the AR server 30 and a receiving unit that receives information from the AR server 30. For example, the communication unit 260 requests the AR server 30 to transmit a virtual object corresponding to the real object recognized by the image recognition unit 224. The communication unit 260 may then transmit identification information of the real object recognized by the image recognition unit 224 to the AR server 30. Then, the communication unit 260 receives the virtual object transmitted from the AR server 30 in response to the above request.

The control unit 244 has a function of superimposing the virtual object received by the communication unit 260 onto a still image and creating the still image operation screen, in addition to all or some of the functions of the control unit 242 according to the second embodiment.

On the other hand, the AR server 30 includes a virtual object acquisition unit 332, a virtual object DB 328, and a communication unit 360 as shown in FIG. 12. The virtual object DB 328 may include database that stores virtual objects to be superimposed onto real objects. Specifically, in the virtual object DB 328, identification information of a virtual object, identification information of a real object, setting information indicating a display position relative to the real object and a posture, and a virtual object to be presented to a user are associated with one another. The virtual object may be in text format or image format.

The virtual object acquisition unit 332 acquires the virtual object and the setting information associated with the identification information of the real object received by the communication unit 360 from the virtual object DB 328.

The communication unit 360 may include an interface with the mobile terminal 20-4, and act as a transmitting unit that transmits information to the mobile terminal 20-4 and a receiving unit that receives information from the mobile terminal 20-4. For example, the communication unit 360 receives identification information of a real object from the mobile terminal 20-4 as a request for transmission of a virtual object, and transmits the virtual object acquired by the virtual object acquisition unit 332 and setting information to the mobile terminal 20-4.

As described above, according to the fourth embodiment, cloud computing can be implemented by incorporating some of the functions for AR into the AR server 30. Note that, although an example in which the functions of the virtual object DB and the virtual object acquisition unit are incorporated into the AR server 30 is described in the fourth embodiment, the functions to be incorporated into the AR server 30 are not limited thereto. For example, the functions of the image recognition unit and the feature value DB may be also incorporated into the AR server 30. In this case, the mobile terminal 20-4 transmits an image captured by the imaging device 213 to the AR server 30, and the AR server 30 performs recognition of a real object and acquisition of a virtual object and then transmits the virtual object to the mobile terminal 20-4.

Furthermore, the functions of creating the real-time recognition screen and the still image operation screen may be incorporated into the AR server 30. In this case, the mobile terminal 20-4 transmits an image captured by the imaging device 213 to the AR server 30, and the AR server 30 performs recognition of a real object, acquisition of a virtual object and superimposition of the virtual object, and then transmits the real-time recognition screen or the still image operation screen in which the virtual object is superimposed to the mobile terminal 20-4. In the case of incorporating the functions of creating the real-time recognition screen and the still image operation screen into the AR server 30, the AR server 30 serves as a display control device.

In the above-described AR system, when the mobile terminal 20-4 requests the AR server 30 to transmit a virtual object at the time of transition to the still image operation mode, there is a concern on the occurrence of a latency from reception to display of the virtual object. In light of this, when criteria for transition to the still image operation mode are likely to be met, the mobile terminal 20-4 according to the fourth embodiment requests the AR server 30 to transmit a virtual object before the criteria for transition to the still image operation mode are met. This is described specifically with reference to FIGS. 13 to 15.

First Operation Example

FIG. 13 is a sequence chart showing a first operation example of the fourth embodiment. Note that, in the first operation example, assume the case where the criteria for transition from the real time recognition mode to the still image operation mode are that a user taps the touch panel 27, e.g., that a user's finger comes into contact with the touch panel 27 and is then removed from the touch panel 27.

As shown in FIG. 13, when contact of a user's finger with the touch panel 27 is detected in the real time recognition mode (S504), the communication unit 260 requests the AR server 30 to transmit a virtual object prior to transition to the still image operation mode (S508).

The virtual object acquisition unit 332 of the AR server 30 acquires a virtual object from the virtual object DB 328 in response to the request from the mobile terminal 20-4 (S512), and the communication unit 360 transmits the virtual object acquired by the virtual object acquisition unit 332 to the mobile terminal 20-4 (S516).

When removal of a user's finger from the touch panel 27 is detected (S520), the control unit 244 of the mobile terminal 20-4 makes transition to the still image operation mode and displays the still image operation screen containing the virtual object on the display 26 (S524).

As described above, when a part of the user operation for transition to the still image operation mode is detected, the mobile terminal 20-4 requests the transmission of a virtual object prior to transition to the still image operation mode. This configuration allows the still image operation screen to be displayed smoothly at the transition to the still image operation mode. Note that, when a latency for display of the still image operation screen occurs in spite of application of this operation example, the control unit 244 may display "Loading" on the display.

Second Operation Example

FIG. 14 is a sequence chart showing a second operation example of the fourth embodiment. Note that, in the second operation example, assume the case where the criteria for transition from the real time recognition mode to the still image operation mode are that a real object is recognized by the image recognition unit 224 in the real time recognition mode and that a user taps the touch panel 27.

As shown in FIG. 14, when a real object is recognized by the image recognition unit 224 in the real time recognition mode (S604), the communication unit 260 may request the AR server 30 to transmit a virtual object prior to transition to the still image operation mode (S608).

The virtual object acquisition unit 332 of the AR server 30 may acquire a virtual object from the virtual object DB 328 in response to the request from the mobile terminal 20-4 (S612), and the communication unit 360 transmits the virtual object acquired by the virtual object acquisition unit 332 to the mobile terminal 20-4 (S616).

When the touch panel 27 is tapped by a user (S620), the control unit 244 of the mobile terminal 20-4 makes transition to the still image operation mode and displays the still image operation screen containing the virtual object on the display 26 (S624).

As described above, when a part of the criteria for transition to the still image operation mode is met, the mobile terminal 20-4 may request the transmission of a virtual object prior to transition to the still image operation mode. This configuration allows the still image operation screen to be displayed smoothly at the transition to the still image operation mode, just like the first operation example.

Third Operation Example

FIG. 15 is a chart showing a third operation example of the fourth embodiment. Note that, in the third operation example, assume the case where the criteria for transition from the real time recognition mode to the still image operation mode are that a user's finger comes into contact with the touch panel 27 and that a change in the posture of the mobile terminal 20-4 is detected.

As shown in FIG. 15, when contact of a user's finger with the touch panel 27 is detected (S704), the communication unit 260 requests the AR server 30 to transmit a virtual object prior to transition to the still image operation mode (S708).

The virtual object acquisition unit 332 of the AR server 30 acquires a virtual object from the virtual object DB 328 in response to the request from the mobile terminal 20-4 (S712), and the communication unit 360 transmits the virtual object acquired by the virtual object acquisition unit 332 to the mobile terminal 20-4 (S716).

When a change in the posture (a predetermined motion pattern) of the mobile terminal 20-4 is detected by the motion sensor 28 (S720), the control unit 244 of the mobile terminal 20-4 makes transition to the still image operation mode and displays the still image operation screen containing the virtual object on the display 26 (S724).

In the above third operation example, as in the second operation example, it is possible to display the still image operation screen smoothly at the transition to the still image operation mode.

3. SUMMARY

As described above, because the mobile terminal 20 according to each embodiment of the present disclosure may have the still image operation mode, it is possible to display the still image operation screen in which a virtual object is superimposed onto a still image of the real space on the display 26 without a need for a user to keep pointing the imaging direction of the mobile terminal 20 toward the real object. It is thereby possible to improve the usability of the mobile terminal 20 for the user and the operability of display of the virtual object.

Although preferred embodiments of the present disclosure are described above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof. For example, although an operation on the touch panel 27 which is detected by the touch panel 27 and a motion of the mobile terminal 20 which is detected by the motion sensor 28 are described as examples of detection of a user operation serving as a trigger for transition to the still image operation mode, a user operation is not limited thereto. Another example of detection of a user operation is recognition of a user gesture. A user gesture can be recognized based on an image acquired by the imaging device 213 or recognized based on an image acquired by another imaging system. Note that the imaging device 213 or another imaging system may image a user gesture by a function such as an infrared camera or a Depth camera.

Further, although an example in which the display control device is the mobile terminal 20 is mainly described in the above embodiments, the display control device may be a device larger than the mobile terminal 20, such as a television or a display device. For example, by using a large display capable of displaying the entire body of a user with connection or integration of an imaging system that images the user from the display control device side with or into the display control device, it is possible to build a function like a mirror that reflects the user and thereby implement an AR application that superimposes a virtual object onto the user to allow operation of the virtual object.

Further, it is not always necessary to perform the steps in the processing of the mobile terminal 20 or the AR server 30 in this specification in chronological order according to the sequence shown in the sequence charts or the flowcharts. For example, the steps in the processing of the mobile terminal 20 or the AR server 30 may be processed in a sequence different from the sequence shown in the flowchart or processed in parallel.

is feasible to create a computer program that causes hardware such a CPU, ROM and RAM incorporated into the mobile terminal 20 or the AR server 30 to perform the equal functions to the elements of the mobile terminal 20 or the AR server 30 described above. Further, a storage medium in which such a computer program is stored may be also provided.

Further, the following configurations are also within the scope of the present disclosure.

(1)
A display control device including a control unit that causes display of a display device to transition between a real space moving image containing a moving image of a real space and a composite image containing a still image of the real space and a virtual object corresponding to a real object contained in the still image.

(2)
The display control device according to (1), wherein the real space moving image contains a moving image of a real space being imaged by an imaging device.

(3)
The display control device according to (1) or (2), wherein display of the virtual object contained in the composite image varies by a user operation.

(4)
The display control device according to any one of (1) to (3), further including a recognition unit that recognizes the real object in the real space moving image, wherein the control unit causes display of the display device to transition from the real space moving image to the composite image when the real object is recognized by the recognition unit.

(5)
The display control device according to any one of (1) to (4), further including an operation detection unit that detects a user operation, wherein the control unit causes display of the display device to transition when a predetermined user operation is detected by the operation detection unit.

(6)
The display control device according to (5), wherein the operation detection unit detects the predetermined user operation on a touch panel mounted on the display device.

(7)
The display control device according to (6), wherein the control unit causes display of the display device to transition from the real space moving image to the composite image when a user operation within a judgment range of the real object on the touch panel is detected.

(8)
The display control device according to (7), wherein the control unit causes display of the display device to transition from the composite image to the real space moving image when a user operation outside the judgment range of the real object on the touch panel is detected.

(9)
The display control device according to (8), wherein the composite image contains a transition operation button, and wherein the control unit causes display of the display device to transition from the composite image to the real space moving image when a user operation in the transition operation button on the touch panel is detected.

(10)
The display control device according to any one of (5) to (9), wherein the operation detection unit includes a motion sensor that detects a motion of the display control device, and wherein the control unit causes display of the display device to transition from the real space moving image to the composite image when a first motion pattern is detected by the motion sensor.

(11)
The display control device according to (10), wherein the control unit causes display of the display device to transition from the composite image to the real space moving image when a second motion pattern different from the first motion pattern is detected by the motion sensor.

(12)
The display control device according to any one of (1) to (11), further including a communication unit that communicates with a server on a network, wherein the communication unit receives the virtual object corresponding to the real object from the server.

(13)
The display control device according to (12), wherein the communication unit requests the server to transmit the virtual object when a part of the predetermined user operation is detected by the operation detection unit, and wherein the control unit causes display of the display device to transition to the composite image after a whole of the predetermined user operation is detected by the operation detection unit.

(14)
The display control device according to (12), wherein the communication unit requests the server to transmit the virtual object when the real object is recognized by the recognition unit, and wherein the control unit causes display of the display device to transition to the composite image after the predetermined user operation is detected by the operation detection unit.

(15)
The display control device according to any one of (1) to (14), further including a quality measurement unit that measures a quality of each frame constituting the real space moving image, wherein the control unit selects one frame constituting the real space moving image as the still image to be contained in the composite image based on a measurement result by the quality measurement unit.

(16)

A display control method including causing display of a display device to transition between a real space moving image containing a moving image of a real space and a composite image containing a still image of the real space and a virtual object corresponding to a real object contained in the still image.

(17)

A program causing a computer to function as a display control device including a control unit that causes display of a display device to transition between a real space moving image containing a moving image of a real space and a composite image containing a still image of the real space and a virtual object corresponding to a real object contained in the still image.

(18)

The program according to (17), wherein the real space moving image contains a moving image of a real space being imaged by an imaging device.

(19)

The program according to (17) or (18), wherein display of the virtual object contained in the composite image varies by a user operation.

(20)

The program according to any one of (17) to (19), wherein the display control device further includes a recognition unit that recognizes the real object in the real space moving image, and wherein the control unit causes display of the display device to transition from the real space moving image to the composite image when the real object is recognized by the recognition unit.

The invention claimed is:

1. An apparatus comprising:
    circuitry configured to:
        cause switching from a real time recognition mode to a still image operation mode upon occurrence of a predetermined user operation;
        store an image of a real space captured in association with the occurrence of the predetermined user operation;
        wherein in the real time recognition mode,
            a live image of the real space is obtained,
            an object of interest from the live image is identified, and
            a virtual image associated with the object of interest superimposed on the live image is displayed,
            in which to maintain the display of the virtual image, the object of interest is captured and identified from the live image, and
            in which a position of the virtual image is changed according to the apparatus posture;
        wherein in the still image operation mode, another virtual image associated with the object of interest is displayed without capturing the live image containing the object of interest, and wherein the another virtual image is determined by the apparatus recognizing the object of interest independent of the orientation of the apparatus and accessing a database comprising an indication of the association between the object of interest and the another virtual image;
        wherein the predetermined user operation includes at least one of
            an area, indicating an instruction for switching from the real time recognition mode to the still image operation mode, being operated,
            an area of the object of interest being operated, or
            an area of the virtual image being operated.

2. The apparatus of claim 1, wherein the virtual image is operable by a user in the real time recognition mode or the still image operation mode.

3. The apparatus of claim 1, wherein the virtual image is operable by a user to switch the virtual image to be displayed among a plurality of virtual images.

4. The apparatus of claim 1, wherein the virtual image is operable by a user to modify a size or a position.

5. The apparatus of claim 1, wherein the virtual image contains detailed information of the object of interest.

6. The apparatus of claim 1, further comprising an operation detection unit to detect the predetermined user operation.

7. The apparatus of claim 6, wherein the operation detection unit is a touch panel.

8. The apparatus of claim 1, further comprising instructions to obtain the virtual image from a remote server.

9. The apparatus of claim 1, further comprising a memory configured to store information of the object of interest.

10. The apparatus of claim 1, wherein the area of the virtual image being operated includes an indication of an instruction for more information of the object of interest.

11. A tangibly embodied non-transitory computer-readable medium configured to store instructions which, when executed by an apparatus, perform a method comprising:
    causing switching from a real time recognition mode to a still image operation mode upon occurrence of a predetermined user operation;
    storing an image of a real space captured in association with the occurrence of the predetermined user operation;
    wherein in the real time recognition mode,
        a live image of the real space is obtained,
        an object of interest from the live image is identified, and
        a virtual image associated with the object of interest superimposed on the live image is displayed,
        in which to maintain the display of the virtual image, the object of interest is captured and identified from the live image, and
        in which a position of the virtual image is changed according to the apparatus posture;
    wherein in the still image operation mode, another virtual image associated with the object of interest is displayed without capturing the live image containing the object of interest, and wherein the another virtual image is determined by the apparatus recognizing the object of interest independent of the orientation of the apparatus and accessing a database comprising an indication of the association between the object of interest and the another virtual image;
    wherein the predetermined user operation includes at least one of
        a certain area, indicating an instruction for switch from the real time recognition mode to the still image operation mode, being operated,
        an area of the object of interest being operated, or
        an area of the virtual image being operated.

12. An image processing method for use in an image processing apparatus, the method comprising:

causing switching from a real time recognition mode switch to a still image operation mode, upon occurrence of a predetermined user operation;

storing an image of a real space captured in association with the occurrence of the predetermined user operation;

wherein in the real time recognition mode,
- a live image of the real space is obtained,
- an object of interest from the live image is identified, and
- a virtual image associated with the object of interest superimposed on the live image is displayed,
- in which to maintain the display of the virtual image, the object of interest is continuously captured and identified from the live image, and
- in which a position of the virtual image is changed according to the apparatus attitude;

wherein in the still image operation mode, another virtual image associated with the object of interest is displayed without capturing the live image containing the object of interest, and wherein the another virtual image is determined by the apparatus recognizing the object of interest independent of the orientation of the apparatus and accessing a database comprising an indication of the association between the object of interest and the another virtual image;

wherein the predetermined user operation includes at least one of
- a certain area, indicating an instruction for switch from the real time recognition mode to the still image operation mode, being operated,
- an area of the object of interest being operated, or
- an area of the virtual image being operated.

* * * * *